US010062132B2

(12) United States Patent
Eramian et al.

(10) Patent No.: US 10,062,132 B2
(45) Date of Patent: Aug. 28, 2018

(54) PARKING GUIDANCE AND PARKING SERVICES PROVIDED THROUGH WIRELESS BEACONS

(71) Applicant: PAYPAL, INC., San Jose, CA (US)

(72) Inventors: David Edward Eramian, Mountain View, CA (US); Erin Christine Ming, San Jose, CA (US); Matthew Scott Zises, San Jose, CA (US); Michael Lenhart Franklin, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 643 days.

(21) Appl. No.: 14/586,868

(22) Filed: Dec. 30, 2014

(65) Prior Publication Data
US 2016/0189324 A1    Jun. 30, 2016

(51) Int. Cl.
| G06Q 50/30 | (2012.01) |
| G06Q 10/02 | (2012.01) |
| H04W 4/04 | (2009.01) |
| H04W 4/80 | (2018.01) |

(52) U.S. Cl.
CPC .......... *G06Q 50/30* (2013.01); *G06Q 10/02* (2013.01); *H04W 4/046* (2013.01); *H04W 4/80* (2018.02); *G06Q 2240/00* (2013.01)

(58) Field of Classification Search
CPC .... G06Q 10/02; G06Q 50/30; G06Q 2240/00; H04W 4/008; H04W 4/046
See application file for complete search history.

(56) References Cited

U.S. PATENT DOCUMENTS

| 5,432,508 A | 7/1995 | Jackson |
| 7,533,809 B1 * | 5/2009 | Robinson ......... G06Q 20/40145 235/382 |
| 2007/0267479 A1 * | 11/2007 | Nix ........................ G06Q 20/10 235/379 |
| 2012/0095791 A1 | 4/2012 | Stefik et al. |
| 2014/0195279 A1 * | 7/2014 | Stefik .................... G06Q 10/02 705/5 |

(Continued)

OTHER PUBLICATIONS

"Realizing Autonomous Valet Parking with Automotive Grade Sensors, (Prasanth Jeevan, Frank Harchut, Bernhard Mueller-Bessler, Burkhard Huhnke), Oct. 2010" (Year: 2010).*

*Primary Examiner* — Kevin H Flynn
*Assistant Examiner* — Ibrahim N El-Bathy
(74) *Attorney, Agent, or Firm* — Haynes and Boone, LLP

(57) ABSTRACT

There are provided systems and methods for parking guidance and parking services provided through wireless beacons. A location may include a nearby or attached parking structure having wireless beacons established throughout the parking structure, such as near an entrance and individual parking spaces of the parking structure. The beacons may provide communication services with a device for the user. When the user arrives at the parking structure, the user may be informed of available parking spaces, payments for parking services based on a loyal customer status, or other parking feature for the parking structure. The wireless beacons may monitor the parking structure and the individual parking spaces to determine a best space for the user. Moreover, once the user leaves the vehicle, the user may provide additional payment for parking time and utilize courier and locker services for purchased items through the wireless beacons.

20 Claims, 7 Drawing Sheets

(56) References Cited

U.S. PATENT DOCUMENTS

2014/0249742 A1 9/2014 Krivacic et al.
2014/0350855 A1* 11/2014 Vishnuvajhala ....... G06Q 50/10
                                                            701/538

* cited by examiner

PARKING GUIDANCE AND PARKING SERVICES PROVIDED THROUGH WIRELESS BEACONS

TECHNICAL FIELD

The present application generally relates to parking guidance and parking services provided through wireless beacons and more specifically to establishing wireless beacons throughout a parking structure or lot in order to guide users to available parking spaces and assist users with transactions with the selected parking space.

BACKGROUND

Various locations, such as retail shopping malls and airports, may offer large parking lots that can be difficult for users to navigate. For example, users may be unaware of where available parking spaces can be found, the closest parking space to a specific service provider, and/or costs of utilizing parking spaces or upgrades. This can lead to poor customer experiences with the locations and drive business from the merchants and/or the parking structures. Thus, certain users may forego utilizing the service providers available at the location, or may utilize public or private transportation to the location where the parking structure itself does not benefit from the payments and/or business the user may provide when the user brings their own transportation. Moreover, this can be costly to the user if the user requires alternative transportation to the location. If the user chooses to bring their own transportation to the location, the user may select a parking space that doesn't best serve the user's purposes or requires additional payments to extend the user's time occupying the parking space. Thus, the user may limit their shopping or visiting experience based on their parking situation.

Figure 1:
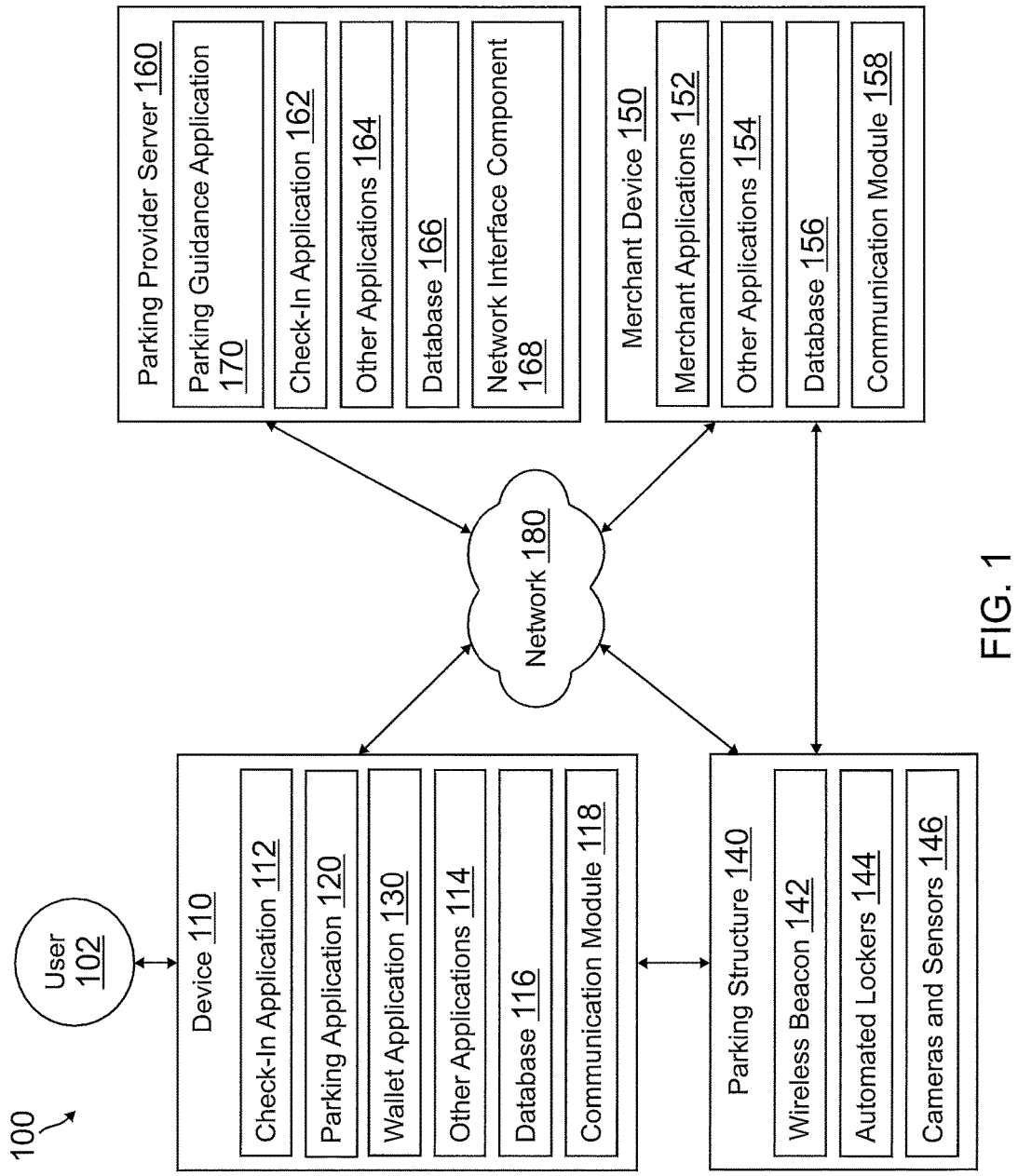
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods that provide parking guidance and parking services through wireless beacons. Systems suitable for practicing methods of the present disclosure are also provided.

Various locations may provide short range wireless communications with a device, such as through beacons using Bluetooth Low Energy (BLE), LTE Direct, or other communication protocol. These beacons may be set up at a location, such as a parking lot, structure, or garage, and communicate with devices to alert users of check-in services through their device. The beacons may provide additional functionality, such as establishing a connection with a device or server entity to complete transactions, including payment and parking services. The beacons may provide communications to the users' devices directly, including information stored in the beacons. The beacons may also provide communication with a device attached to, or in communication with, the beacon, such as a device/server of a merchant and/or parking provider.

Parking locations (e.g., structures, garages, lots, etc.) may be located in various areas, such as adjacent or park of a shopping mall, transportation hub, or civic/entertainment center. Parking service providers may establish wireless beacons throughout the parking location. These beacons may utilize a short range wireless communications to communicate with a device of the user. For example, the beacons may be established at an entry to the parking location, in individual parking spaces/locations/stalls of the parking location, and/or through driving lanes of the parking structure. The beacons may employ Bluetooth Low Energy (BLE), LTE Direct, or another communication protocol to emit a communication signal receivable by the user's device. The communication may include an identifier for the beacon, the user, a nearby merchant or service provider, and/or a payment provider.

The user's device may be set up to passively monitor for BLE communications. When the device detects the signal and verifies the one or more identifiers, both the device and the beacon may ramp up in power and establish a connection, where the connection may further enable the device to communicate with various connected entities, devices, and/ or servers. The beacon may be connected to a networked device at the parking location, or the beacon may include network functionality to communicate with other devices and/or servers. Thus, the beacon enables the user's device to establish a connection, communicate check-in information (e.g., an identifier for the user), and/or complete a check-in with the parking location or parking spaces in the parking location. The check-in may be completed automatically when the user's device is in range of the beacon, or may be completed after prompting the user to check-in when the user's device is in range of the beacon.

Once the merchant has established the wireless beacons in the parking location, the wireless beacon(s) may connect to the user's device when the device is in proximity to the wireless beacon(s). For example, a wireless beacon may broadcast the identifier that initiates a check-in within an area around the wireless beacon. Thus, as the user's device enters that area (e.g., an entrance to the parking location and/or parking spaces at the parking location), the device may connect to the wireless beacon and/or initiate a check-in process. The beacons may be range limited to correspond only to a specific part of the parking location, such as the parking spaces. Thus, if a device connects to a wireless beacon for a parking space, it may be determined that the user is occupying the parking space, for example, using a vehicle that the user has parked in the parking space.

Once the user's device connects to one of the wireless beacons when arriving at the parking location having a plurality of parking spaces, the user may be informed of available parking spaces at the parking location. Wireless beacons established throughout the parking location may determine which parking spaces of the plurality of parking spaces are available based on connections between devices for users and wireless beacons at or nearby the parking spaces. When a user pulls into a parking space, their device may connect with the wireless beacon in the parking space and inform a parking service provider (e.g., a parking provider device/server) that the user is occupying the space. When the user arrives again at the space and leaves, the parking service provider may be informed that the space is once again available. In other embodiments, sensors in the parking spaces may information the parking service provider that the parking space is occupied (e.g., using cameras infrared sensors, scales, etc.). Thus, other users may view a map received from the parking service provider with available parking spaces and may be guided to the available parking spaces using the other users' devices.

Additional sensors and/or cameras may be established throughout the parking location in order to view a size and/or congestion rate of available parking spaces. Thus, if several parking spaces are available in one area, whereas another area has only 1 space available with a very tight fit, the parking service provider may communicate the information about the size of parking spaces to the user through the user's device. In various embodiments, the parking service provider may determine a parking space for the user based on information received about the user and the size/availability of parking spaces. The parking service provider may receive information about the vehicle for the user, such as type, model, make, electric/hybrid car type, and/or size. Additionally, the parking service provider may receive information about occupants in the vehicle, such as a number and/or needs to the occupants (e.g., disability issues, ages, etc.). Using this information with parking space size and/or availability, the parking service provider may guide the user to certain spaces that may be more optimized for the user's needs. For example, users with electric cars may be given preferential parking or spaces designated for electric charging. In other embodiments, expectant mothers, elderly users, or other status or condition may affect where the parking service provider offers parking spaces. The parking service provider may reserve particular parking spaces for these parameters. The parking service provider may also receive information about a loyalty account for the user or past purchases with a merchant nearby and associated with the parking location. Thus, if the user is a preferred customer, the user may be guided to certain spaces (including paid or premium spaces) based on information about the user. The merchant may choose to provide payment to the parking service provider for use of the preferred parking space by the user.

The user may complete a payment for use of the parking location using the wireless beacons after connection to one or more of the wireless beacons using the user's device. Additionally, the user may wish to purchase additional parking time for a parking space after the user leaves the vehicle. The user may provide payment over a network connection. Moreover, once the user has parked in a parking space and is identified with the parking space, a merchant where the user is visiting or shopping may choose to purchase additional parking time for the user. In various embodiments, the merchant may upgrade the user to better parking and may utilize the network of wireless beacons to find the user's vehicle, move the vehicle, and alert the user of the vehicle's new parking space. Thus, the user may shop without concerns for parking meters and/or parking fines. The merchant may also utilize the wireless beacons with storage lockers located at or nearby the parking space for the user to provide curbside delivery. Thus, an employee of the merchant may add items to the storage locker for the user, which may be determined using information about where the user parked. The storage locker may be configured to open when the user's device is within range of a wireless beacon for the storage locker, or through security/identification verification by the user when the user arrives at the storage locker.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a device 110, a parking structure 140 having wireless beacons 142, automated lockers 144, and cameras and sensors 146, a merchant device 150, and parking provider server 160 in communication over a network 180. User 102 may arrive at parking structure 140 in order to park a vehicle in a parking space. Device 110 may establish a connection with one or more of wireless beacons 142. User 102 may then receive parking guidance to available parking spaces from parking provider server 160. Additionally, merchant device 130 provides parking payment and services for parking spaces for user 102 to parking provider server 160.

Device 110, ordering display 142, wireless beacons 142, merchant device 150, and parking provider server 160 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 180.

Device 110 may be implemented using any appropriate hardware and software configured for wired and/or wireless communication with wireless beacons 142, merchant device 150, and/or parking provider server 160. For example, in one embodiment, device 110 may be implemented as a personal computer (PC), a smart phone, laptop computer, wristwatch with appropriate computer hardware resources, eyeglasses with appropriate computer hardware (e.g. GOOGLE GLASS®), or other wearable computing device, a computing device mounted within a vehicle (e.g., a console or heads up display computing device in a vehicle), and/or other types of computing devices capable of transmitting and/or receiving data, such as an IPAD® from APPLE®. Thus, device 110 may correspond to a device embedded within the vehicle, which may provide information to user 102 through a display for the device, such as a navigation screen and/or payment application of device 110. However, in other embodiments, two or more devices may function in unison to provide the below described features, such as a smart phone interacting with a console or hears up display mounted in the vehicle. Although a user device is shown, the user device may be managed or controlled by any suitable processing device. Although only one user device is shown, a plurality of user devices may function similarly.

Device 110 of FIG. 1 contains a check-in application 112, a parking application 120, a wallet application 130, other applications 114, a database 116, and a communication module 118. Check-in application 112, parking application 120, wallet application 130, and other applications 114 may correspond to processes, procedures, and/or applications executable by a hardware processor, for example, a software program. In other embodiments, device 110 may include additional or different software as required.

Check-in application 112 may be used by user 102 of device 110 to establish a connection with wireless beacons 142, including a check-in with parking provider server 160. Check-in application 112 may correspond to a specific application utilized by device 110 with wireless beacons 142 and/or parking provider server 160 to complete a check-in for parking structure 140 and/or a parking space within parking structure 140. The check-in with parking provider server 160 may correspond to a process to log in to a user account of user 102 with parking provider server 160 (or a payment provider if the payment provider server provides check-in services for parking provider server 160). In other embodiments, the check-in may provide and/or verify the identity of user 102, including transmission of an identifier for user 102 and/or device 110. The check-in may be completed over network 180 with merchant device 150. In such embodiments, check-in application 112 may correspond more generally to a browser application configured to communicate with parking provider server 160 over a network connection (e.g., over a connection with network 180).

In various embodiments, check-in application 112 may also receive short range wireless communications from wireless beacons 142 at parking structure 140 and transmit information to wireless beacons 142. In various embodiments the information may include an identifier for user 102/device 110, information corresponding to user 102 and/or a vehicle for user 102, and/or check-in information for a check-in process with parking provider server 160 (or a payment provider if the payment provider server provides check-in services for parking provider server 160) that associates user 102 with wireless beacons 142. For example, wireless beacons 142 may be located throughout parking structure 140, including at an entrance and parking spaces in parking structure 140, where wireless beacons 142 are set up to communicate with device 110 when device 110 is in proximity to each of wireless beacons 142. Thus, each of wireless beacons 142 may be range limited to connect only with devices (e.g., device 110) within a specified area, such as a radius around each of wireless beacons 142, a distance away from each of wireless beacons 142, and/or a signal direction for each of wireless beacons 142. In various embodiments, each of wireless beacons 142 may connect to device 110 when device 110 is located in a vehicle that is currently located within proximity to each wireless beacons 142. Based on the proximity for connection to each of wireless beacons 142, check-in application 112 may transmit information to one or more of wireless beacons 142 when user 102 is nearby one or more of wireless beacons 142, enabling merchant device 150 to determine that user 102 is located in proximity to one or more of wireless beacons 142 receiving the information.

Check-in application 112 may execute in the background of an operating system of device 110 and be configured to establish connections, using communication module 118 of device 110, with one or more of wireless beacons 142. The connection may be established with or without user input from user 102. For example, each of wireless beacons 142 may broadcast a token, such as a universally unique identifier (UUID), for reception by check-in application 112, as will be explained in more detail herein. Check-in application 112 may utilize communication module 118 of device 110 to receive the token from wireless beacons 142. If check-in application 112 acknowledges the UUID as identifying one of wireless beacons 142, merchant device 150, and/or parking provider server 160 (e.g., if check-in application 112 determines the UUID corresponds to a request to establish a communication channel and/or process and complete a check-in), check-in application 112 may transmit an identifier corresponding to user 102 and/or device 110 back to the wireless beacon of wireless beacon 142 transmitting the UUID. Check-in application 112 may utilize communication module 118 of device 110 to communicate with one or more of wireless beacons 142 (e.g., over near field communication, Bluetooth, Bluetooth Low Energy, radio, infrared, LTE Direct, or other communication protocol). The identifier from device 110 may include, be transmitted with, concatenated with, or otherwise bundled with the identifier received from one or more of wireless beacons 142. In other embodiments, different information may be transmitted to wireless beacons 142, such as an identifier for user 102, a name or other personal information for user 102, vehicle and/or vehicle occupant information, and/or loyalty account/transaction history information. Thus, the information transmitted to wireless beacons 142 does not need to be utilized to process and/or complete a check-in for all embodiments.

Once a connection is established with one or more of wireless beacons 142, device 110 may be checked-in with parking provider server 160 if user 102 has not previously been checked-in. The check-in process may then associate user 102 with the wireless beacon of wireless beacons 142 used to connect to device 110. For example, parking provider server 160 may previously have registered each of wireless beacons 142 as located in at an entrance or parking spaces of parking structure 140. Thus, parking provider server 160 is informed that user 102 is at an entrance or parking space for parking structure 140. As previously discussed, in other embodiments, a check-in need not be processed and/or completed to associate user 102 with areas of parking structure 140. Thus, other connections and data transfers to one or more wireless beacons 142 may be sufficient to associate user 102 with areas of parking structure 140.

Parking application 120 may correspond to, in various embodiments, an application that allows user 102 to view parking guidance information and request and/or process parking services. In this regard, parking application 120 may display in an application interface a map for parking structure 140 and parking spaces for parking structure 140 on the map. The map may display available parking spaces as well as information for the available parking spaces (e.g., size, price to occupy the space, space features including handicap space and/or handicap accessibility, etc.). Although parking application 120 is discussed in reference to a car, truck, or other enclosed vehicle type, parking application 120 may also work for boats, motorcycles, airplanes, and/or other types of conveyances. Thus, device 110 may be mounted in any vehicle type. The map may be previously received by device 110, such as over network 180, or may be received by device 110 when connected to one or more of wireless beacons 142. The available parking spaces and information about the parking spaces may be determined by parking provider server 160 using wireless beacons 142 and/or cameras and sensors 146, as will be explained in more detail herein. The displayed information for the available parking spaces may be dynamic to change when the parking spaces become no longer available. Additionally, the map may display an optimized, preferred, or "best" parking space for user 102 based on information received about user 102, such as a vehicle size, needs requirements, and/or vehicle occupant information. Information about user 102 and/or a vehicle user 102 is utilizing may be transmitted to parking provider server 160 during the connection/check-in process by check-in application 112, such as in check-in information or associate with an identifier. Additionally, user 102 may utilize parking application to enter parameters and information about user 102, such as disability or handicap information, a medical status or condition (including a pregnant status), information about vehicle occupancy and/or vehicle type (e.g., electric vehicles), etc. Additionally, parking application 120 may include or interface with (e.g., through API's of parking application 120 and one or more other applications) social networking processes that may display nearby spaces of contacts, friends, or other social networking connections. Thus, user 102 may locate friends, family, coworkers, or other related users when travelling to a location with or to meet the related user(s).

Parking application 120 may further include processes to receive and/or request parking services, such as paid parking based on a loyalty account and/or transaction histories with a merchant corresponding to parking structure 140, such as a merchant for merchant device 150. In this regard, parking application 120 may be utilized in conjunction with wallet application 130, database 116, and/or merchant device 150 to determine if user 102 may be offered parking services, such as a payment for parking fees for parking structure 140, an upgrade to valet or preferred parking spaces and/or services, or parking validation/payment for exiting parking structure 140. Merchant device 150 may make determinations for the parking services offered to user 102 and communicate the offered parking services to payment provider server 160, which may then present the offered parking services to user 102 through parking application 120. Parking application 120 may also enable user 102 to request the parking services from merchant device 150, such as through a rewards page and/or service request page. Parking application 120 may also request and/or receive one or more coupons from nearby merchants that may offer parking services to user 102 (e.g., through a push/pull mechanism with merchant device 150). In various embodiments, parking application 120 may also receive messages from merchant device 150 about current traffic at a merchant location or nearby streets, including how busy foot traffic, lines, wait times, and/or purchase lanes are at the merchant location to inform user 102 of expected wait times or delays.

Parking application 120 may also be utilized to request curbside deliver and/or usage of automated lockers 144 for items user 102 may purchase while visiting a merchant for merchant device 150. With regard to curbside deliver, parking application 120 may be configured to request curbside delivery from an employee for the merchant. The employee may retrieve parking information, such as the parking space for user 102, from device 110 and/or parking provider server 160 after user 102 parks in a parking space and has connected to one or more of wireless beacons 142. Thus, the employee may utilize this information to take purchases and/or preorders to a vehicle for user 102. Moreover, with regard to automated lockers 144, parking application 120 may include a process to request use of one or more of automated lockers 144 for a parking space for user 102. Automated lockers 144 may be utilized to store items user 102 has preordered and/or purchased at the merchant location. Thus, an employee may, similar to curbside delivery described above, bring items to one of automated lockers 144 and store the items in one of automated lockers 144 for later retrieval by user 102. Thus, when user 102 arrives at the one of automated lockers 144 storing the item(s), user 102 may access the automated locker of automated lockers 144 and retrieve the item(s). Parking application 120 may display information enabling user 102 to access the automated locker of automated lockers 144, such as an access code, or the automated locker may open when device 110 connects to one of wireless beacons 142 corresponding to the automated locker.

Wallet application 130 may be used, for example, to provide a convenient interface to permit user 102 to select payment options and provide payment for items and/or services. For example, wallet application 130 may be implemented as an application having a user interface enabling the user to enter payment options for storage by device 110, provide payment to merchant device 150 and/or parking provider server 160 (e.g., for parking fees, validation, parking services, and/or items/services purchased by user 102), and complete a transaction for the items and/or services. Wallet application 130 may be configured to provide payment to merchant device 150 and/or parking provider server 160. In this regard, wallet application 130 may correspond to an application that may provide an interface where user 102 may view a payment order, such as one for items/services, and/or parking related expenses. Additionally, user 102 may generate a payment request for the payment order. The payment request may instruct a payment provider to provide payment to merchant device 150 and/or parking provider server 160. Additionally, the payment request may include identification of a payment instrument that user 102 wishes to utilize. Wallet application 130 may correspond to a dedicated application for parking provider server 160 (e.g., a specific device application) or may correspond to a browser application configured to view information available over the Internet or access a website corresponding to a payment provider.

Wallet application 130 may also store and/or access information about loyalty accounts, past transaction histories, and/or parking rewards/benefits offered to user 102. Such information may be stored to database 116 or may be accessible from merchant device 150. Parking provider server 160 may receive and/or access the information from device 110 and/or merchant device 150. The information may be utilized to provide user 102 with parking fee payments, validations, services, and/or upgrades, as will be explained in more details here.

In various embodiments, one or more features of check-in application 112, parking application 120, and/or wallet application 130 may be incorporated in the same application so as to provide their respective features in one application.

Device 110 includes other applications 114 as may be desired in particular embodiments to provide features to device 110. For example, other applications 114 may include security applications for implementing client-side security features, programmatic client applications for interfacing with appropriate application programming interfaces (APIs) over network 180, or other types of applications. Other applications 114 may also include email, texting, voice and IM applications that allow a user to send and receive emails, calls, texts, and other notifications through network 180. In various embodiments, other applications 114 may include financial applications, such as banking, online payments, money transfer, or other applications associated with parking provider server 160. Other applications 114 may include browser, social networking, and/or mapping applications, which may also be used in conjunction with check-in application 112, parking application 120, and/or wallet application 130. Other applications 114 may contain software programs, executable by a processor, including a graphical user interface (GUI) configured to provide an interface to the user.

Device 110 may further include database 116 which may include, for example, identifiers such as operating system registry entries, cookies associated with check-in application 112, parking application 120, wallet application 130, and/or other applications 114, identifiers associated with hardware of device 110, or other appropriate identifiers, such as identifiers used for payment/user/device authentication or identification. Identifiers in database 116 may be used by a payment/credit provider to associate device 110 with a particular account maintained by the payment/credit provider. Database 116 may include user device tokens and/or encryption keys, including an encryption key for wireless beacons 142, merchant device 150, and/or parking provider server 160. Database 116 may include identifying information for tokens enabling check-in application 112 to identify wireless beacons 142, merchant device 150, and/or parking provider server 160 when receiving a corresponding check-in token. Additionally, database 116 may include data received by parking application 120 and/or wallet application 130, including maps, available parking locations/ spaces, optimized parking spaces, parking rewards and/or upgrades, and/or curbside delivery information or use of one of automated lockers 144 information.

Device 110 includes at least one communication module 118 adapted to communicate with wireless beacons 142, merchant device 150, and/or parking provider server 160. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with wireless beacons 142 using short range communications, such as Bluetooth Low Energy, LTE Direct, WiFi, radio frequency, infrared, Bluetooth, and near field communications.

Parking structure 140 may be implemented as a physical parking location, such as a parking lot, a parking building/ structure, a parking garage, or other physical embodiment of an area where users (e.g., user 102) may visit and park a vehicle. In this regard, parking structure 140 may include parking spaces/locations where a single or multiple vehicles (e.g., cars, motorcycles, trucks, etc.) may park. Parking structure 140 may further include entrances and exits along with various means to regulate entrance and exit, such as automated and manual gates. Parking structure 140 may further include various mechanisms to complete payment for parking fees, tolls, and/or services. For example, parking structure 140 may include an automated gate where user 102 takes a ticket and pays or receives validation for an amount of time user 102 leaves their vehicle within parking structure 140. In other embodiments, individual parking spaces of parking structure 140 may include meters or other hardware/ software and mechanisms to provide time related parking fees.

Parking structure 140 of FIG. 1 further includes wireless beacons 142, automated lockers 144, and cameras and sensors 146. Wireless beacons 142, automated lockers 144, and cameras and sensors 146 may include hardware and software necessary to execute the processes and functions as described below. In other embodiments, parking structure 140 may include displays, hardware, and/or software as required.

Wireless beacons 142 may be maintained, for example, by a merchant for merchant device 150 and/or parking provider server 160. Wireless beacons 142 may be implemented using any appropriate hardware and software configured for wireless communication with device 110. For example, in one embodiment, wireless beacons 142 may be implemented as dongle devices including a hardware processor and a communication module, for example, connected to device at the location of merchant 104. Wireless beacons 142 may also be implemented as devices incorporated within a personal computer (PC), a smart phone, laptop computer, and/or other types of computing devices capable of transmitting and/or receiving data, such as an IPAD® from APPLE®. Wireless beacons 142 may also act as stand-alone devices including a processor, communication module, and/ or network interface component configured to communicate with device 110 and/or parking provider server 160. Although wireless beacons 142 are described as a plurality, a single wireless beacon may also be used, for example, with a single parking space.

Wireless beacons 142 may be located throughout parking structure 140, such as at entrances, exits, driving lanes, and/or parking spaces of parking structure 140. Wireless beacons 142 may be limited, either by signal range or physical boundaries, to areas of parking structure 140, such as the aforementioned entrances, exits, driving lanes, and/or parking spaces of parking structure 140. Wireless beacons 142 of FIG. 1 contain processes, procedures, and/or applications executable by a hardware processor, for example, a software program, configured to interact with device 110, merchant device 150, and/or parking provider server 160. Thus, regardless of the implementation of wireless beacons 142 as discussed above, wireless beacons 142 may utilize a connection/check-in process and include or be connected to a communication module. In other embodiments, wireless beacons 142 may include additional or different hardware and software as required.

Wireless beacons 142 may include an application for transmitting requests to establish a connection between a device (e.g., device 110) and one of wireless beacons 142. The requests may be unique to each of wireless beacons 142, thereby identifying each of wireless beacons 142. Wireless beacons 142 may utilize short range wireless communications of wireless beacons 142 to transmit the requests to establish a connection, including an identifier such as a Universally Unique Identifier (UUID). If device 110 receives a request to establish the connection with one of wireless beacons 142 and responds with an identifier for user 102/device 110 (potentially including the UUID and other information necessary to effectuate a check-in for user 102), the beacon of wireless beacons 142 receiving the communication may ramp up in power and create a connection between device 110 and the beacon of wireless beacons 142.

Wireless beacons 142 may transmit the request to establish the connection with wireless beacons 142 as a short range wireless communication (e.g. a BLE protocol communication) including a "wake up" process for check-in application 112 of device 110 and/or a token for the beacon of wireless beacons 142 transmitting the request. In other embodiments, the request and/or connection may utilize near field communication, radio communication, infrared communication, or Bluetooth communication. Additionally, although wireless beacons 142 may utilize BLE protocol communications to effectuate an "always on" type service where the UUID and "wake up" process are transmitted continuously, other communication protocols used to provide an "always on" service may include QUALCOMM® LTE Direct or similar device-to-device communication technology. BLE and LTE Direct may both be utilized to provide discovery of nearby devices to wireless beacons 142 (e.g., device 110 and/or merchant device 150) and establishment of a connection for data transfers. In other embodiments, wireless beacons 142 may correspond to other devices, such as WiFi capable devices, near field communication devices, etc.

The request may be specific to device 110 by including information that is specific to user 102, such as a name, identifier, or user device identifier. The information specific to user 102 may be determined from a user account of user 102 or other information previously provided to merchant device 150 and/or parking provider server 160 (e.g., an identifier for user 102 provided to merchant device 150 and/or parking provider server 160 during a check-in request). Thus, in certain embodiments, only device 110 will pick up and authenticate the request, for example, if user 102 has previously check-in or connected with one of wireless beacons 142 (e.g., when first parking in a parking space at parking structure 140). Wireless beacons 142 may also be limited to only connect to device 110 if device 110 is in proximity to one of wireless beacons 142. The range limitation of wireless beacons 142 may be fixed or may be determined based on an approximate parking space and/or vehicle size detected in the parking space. For example, one of wireless beacons 142 established at parking structure 140 may be limited in range only to connect to device 110 if device 110 is located in parking space at parking structure 140.

After one of wireless beacons 142 receives an identifier from device 110, the beacon of wireless beacons 142 may determine user 102 is in proximity to the beacon of wireless beacons 142. Wireless beacons 142 may pass the identifier (and any other device's identifiers where applicable) to merchant device 150 and/or parking provider server 160 to associate user 102 (and the other users where applicable) with the beacon of wireless beacons 142 receiving the identifier. By associating user 102 with wireless beacons 142, merchant device 150 and/or parking provider server 160 may determine where user 102 (and the other users where applicable) is located at parking structure 140. Thus, if user 102 is at an entrance and has yet to park, parking provider server 160 may determine user 102 is requesting parking guidance and may provider user 102 with parking guidance, such as available parking spaces, on device 110.

However, if device 110 connects to a beacon of wireless beacons 142 that is located at or nearby a parking space, then parking provider server 160 may determine user 102 has parked a vehicle in the parking space. If user 102 has previously been associated with the parking space (e.g., has already parked a car in the space), it may be determined that user 102 is leaving the parking space with their vehicle. Parking provider server 160 may also use cameras and sensors 146 to assist in the aforementioned determinations, as will be explained in more detail herein. Information about the beacon of wireless beacons 142 connecting with device 110 when user 102 parks a vehicle in at a parking space for the beacon may be transmitted to merchant device 150 and/or parking provider server 160 for use in curbside delivery, parking payments and service upgrades, determination of available parking spaces, and/or information or assistance for user 102.

One or more of wireless beacons 142 may be connected to a meter or other parking fee mechanism for parking structure 140. Thus, user 102 may provide payment to for a parking fee using a connection between device 110 and the beacon of wireless beacons 142 connected to the mechanism. The parking meter or other mechanism may include a network capability enabling user 102 and/or a merchant for merchant device 150 to re-up or add additional payments to the parking fee using device 110 while device 110 is not connected to the beacon over a short range wireless connection. However, in other embodiments, the beacon of wireless beacons 142 may provide the network capabilities to the meter/mechanism.

One or more of wireless beacons 142 may also be connected with each of automated lockers 142. Automated lockers 144 may each correspond to a storage unit, locker, bin, or other space where a merchant (or merchant employee) corresponding to merchant device 150 may place purchased and/or pre-ordered items by user 102 for later retrieval by user 102. Thus, automated lockers 144 may include a mechanical locker having a space and corresponding hardware and/or software enabling safe storage through a lock or other safety mechanism. The merchant may have items store to one of automated lockers 144 based on a request by user 102. For example, user 102 may wish to continue shopping after pick and/or purchasing a large item. Thus, user 102 may have the item stored to one of automated lockers 144. Additionally, the merchant may inform user 102 of the existence and use of automated lockers 144 and provide user 102 with the user of one of automated lockers 144. As previously discussed, merchant device 150 may receive information corresponding to the parking space occupied by the vehicle for user 102. Thus, one of automated lockers 144 corresponding to that parking space may be utilized to store user 102's items. User 102 may access their locker of automated lockers 144 using information provided to device 110 by merchant device 150 and/or parking provider server 160, such as an identification information, access code, biometric instruction, etc. Additionally, in certain embodiments, one of wireless beacons 142 may be attached or corresponding to the locker of automated lockers 144. Thus, when user 102 approaches the locker with device 110, the locker may open or allow user 102 to access the locker when a connection occurs between device 110 and the beacon of wireless beacons 142.

In various embodiments, parking structure 140 includes cameras and sensors 146. Cameras and sensors 146 may correspond to video cameras, still image cameras, infrared cameras, and/or other imaging devices capturing information to provide parking provider server 160. Cameras and sensors 146 may also correspond to scales, weight sensors, infrared sensors, and/or other positional sensors for providing additional data to parking provider server 160. Information gathered by cameras and sensors 146 may be utilized by parking provider server 160 to determine whether a vehicle is located in a parking space, what parking spaces are available in parking structure 140, and/or a size of each of the parking spaces in parking structure 140. For example, a size of parking spaces may differ if a large vehicle is taking a larger portion of an available parking space where nearby vehicles may have difficulty opening their doors for their occupants. Thus, cameras and sensors 146 may be capable whether a parking space is filled and the capacity of the parking space and nearby parking spaces.

Wireless beacons 142 may utilize a communication module to connect with one or more of device 110, merchant device 150, and/or parking provider server 160 to communicate identifiers and/or check-in information. Thus, wireless beacons 142 each include a communication module adapted to communicate with device 110, merchant device 150, and/or parking provider server 160. The communication module may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. The communication module of wireless beacons 142 may also communicate with device 110 and/or merchant device 150 using short range communications, such as Bluetooth Low Energy, LTE Direct, WiFi, radio frequency, infrared, Bluetooth, and near field communications.

Merchant device 150 may correspond to a device used by merchant 104 to view, process, and complete financial transactions for items and/or services user 102 wishes to purchase. Thus, merchant device 150 may correspond to a merchant and be located at the merchant's location nearby parking structure 140. Merchant device 150 may be implemented using any appropriate hardware and software configured for wired and/or wireless communication with device 110, wireless beacons 142, and/or parking provider server 160. For example, merchant device 150 may be implemented as a personal computer (PC), a smart phone, laptop computer, wristwatch with appropriate computer hardware resources, eyeglasses with appropriate computer hardware (e.g. GOOGLE GLASS®), other type of wearable computing device, and/or other types of computing devices capable of transmitting and/or receiving data, such as an IPAD® from APPLE®. Although a merchant device is shown, the merchant device may be managed or controlled by any suitable processing device. Although only one merchant device is shown, a plurality of merchant devices may function similarly. Moreover, in various embodiments, one or more of the applications, processes, and/or features discussed below in reference to merchant device 150 may be included in parking provider server 160, and vice versa.

Merchant device 150 of FIG. 1 contains merchant applications 152, other applications 154, a database 156, and a communication module 158. Merchant applications 152 and other applications 154 may correspond to processes, procedures, and/or applications executable by a hardware processor, for example, a software program. In other embodiments, merchant device 150 may include additional or different software as required.

Merchant applications 152 may correspond to one or more device applications configured to process and/or complete transactions for items and/or services by user 102, establish and/or access a transaction history with the merchant for merchant device 150 (e.g., past user purchases and/or actions with the merchant), and/or provide loyalty account services and benefits to user 102. Merchant applications 152 may therefore provide a convenient interface to permit the merchant and/or a merchant employee to view selected item/service information and complete a transaction for the items/services (e.g., receive payment for the items/services). Once the transaction is approved, merchant application 152 may be utilized to request and process a payment for the items/service. Merchant applications 152 may receive payment from device 110. In various embodiments, the merchant may also receive physical payment instruments, such as cash and/or payment cards from user 102. Thus, merchant sales application 160 may also be utilized to run payment cards, complete cash transactions, and/or otherwise complete payment for the order. Once payment for the order is complete, merchant application 152 may be configured to generate, update, and/or process a transaction history for user 102. The transaction history may include receipts or other documentation of past transactions by user 102 with the merchant for merchant device 150. The transaction history may be provided to device 110 and/or parking provider server 160.

Merchant applications 152 may also be used by the merchant for merchant device 150 to request use of one or more of automated lockers 144. Thus, merchant applications 152 may receive information for which locker of automated lockers 144 correspond to user 102, for example, by determining a parking space for user 102 based on a connection between device 110 and one or more of wireless beacons 142 (e.g., a triangulation of user 102's vehicle's location in parking structure 140 using wireless beacons 142). Once a locker of automated lockers 144 has been determined, merchant applications 152 may inform an employee or other person of the whereabouts and/or identification information for the locker so that the person may place items purchased by user 102 in the locker. Additionally, merchant applications 152 may update user 102 through device 110 of the whereabouts and/or information, and may provide user 102 with any access codes or other authorization information for the locker.

Merchant applications 152 may document user 102's history with the merchant, such as a transaction history, as previously discussed. Additionally, merchant applications 152 may be utilized to establish and maintain a loyalty account for user 102. Utilizing the transaction history and/or the loyalty account, parking benefits, upgrades, payments, and/or services may be extended to user 102 for use in parking structure 140. For example, user 102 may be given an upgrade to valet or preferred parking, or may receive car wash, interior cleaning, oil change, or other service while user 102's vehicle is in parking structure 140. Additionally, validation of a parking pass with a parking fee may be done based on user 102's history/loyalty account, or payment for metered or other time based parking service may be issued, processed, and/or completed by merchant application 152. In various embodiments, merchant applications 152 may inform parking provider server 160 and/or an employee working with parking structure 140 of the upgrades or extended services so that they may provide the benefits to the vehicle of user 102 while user 102 is still shopping with the merchant of merchant device 150.

Merchant device 150 includes other applications 154 as may be desired in particular embodiments to provide features to merchant device 150. For example, other applications 154 may include security applications for implementing client-side security features, programmatic client applications for interfacing with appropriate application programming interfaces (APIs) over network 180, or other types of applications. In various embodiments, other applications 154 may include financial applications, such as banking, online payments, money transfer, or other applications associated with parking provider server 160. Other applications 154 may contain other software programs, executable by a processor, including a graphical user interface (GUI) configured to provide an interface to the user.

Merchant device 150 may further include database 156 which may include, for example, identifiers such as operating system registry entries, cookies associated with check-in application 162, merchant sales application 160, and/or other applications 154, identifiers associated with hardware of merchant device 150, or other appropriate identifiers, such as identifiers used for payment/user/device authentication or identification. In one embodiment, identifiers in database 156 may be used by parking provider server 160 to associate merchant device 150 with a particular account maintained by parking provider server 160. Database 156 may also store user 102's information, including check-in information, an identifier, etc., for user 102, and any parking information, such as a parking space identifier, location, number, etc. Database 156 may include transaction histories for users, such as user 102, and loyalty accounts for the users.

Merchant device 150 includes at least one communication module 158 adapted to communicate with device 110, wireless beacons 142, and/or parking provider server 160. In various embodiments, communication module 158 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 158 may communicate directly with wireless beacons 142 using short range communications, such as Bluetooth Low Energy, LTE Direct, radio frequency, infrared, Bluetooth, and near field communications.

Parking provider server 160 may be maintained, for example, by an online payment service provider, which may provide parking guidance and services for parking structure 140. In this regard, parking provider server 160 includes one or more processing applications which may be configured to interact with device 110, wireless beacons 142, and/or merchant device 150 to facilitate parking. However, in other embodiments, parking provider server 160 may be maintained by or include any service provider, as well as merchants, such as a merchant for merchant device 150, that offer parking at their locations. Moreover, in various embodiments, one or more of the applications, processes, and/or features discussed below in reference to parking provider server 160 may be included in merchant device 150, and vice versa.

Parking provider server 160 of FIG. 1 includes a parking guidance application 170, a check-in application 162, other applications 164, a database 166, and a network interface component 168. Parking guidance application 170, check-in application 162 and other applications 164 may correspond to processes, procedures, and/or applications executable by a hardware processor, for example, a software program. In other embodiments, parking provider server 160 may include additional or different software as required.

Parking guidance application 170 may be correspond to an application including features and processes to provide parking guidance to user 102 and assist user 102 with receiving parking services, including parking upgrades, loyalty customer parking, parking validation and payments, and use of curbside delivery and/or automated lockers 144. In this regard, parking guidance application 170 may receive information from parking structure 140 in order to provide parking guidance to user 102. Wireless beacons 142 and cameras and sensors 146 may transmit data to parking provider server 160, which may be utilized to determine which parking spaces in parking structure 140 are available, size of the available parking spaces, and/or routing (e.g., traffic guidance) information to the available parking spaces. For example, wireless beacons 142 may be utilized to determine when user 102 enters parking structure 140, when user 102 parks a vehicle in a parking space, when user 102 exits a parking space with their vehicle, and when user 102 exits parking structure 140 based on connections between device 110 and one or more of wireless beacons 142. Moreover, cameras and sensors 146 may be utilized to determine vehicle size, parking space size, and available room/space within a parking space. Thus, scales, weight sensors, infrared/position sensors, and/or imaging cameras may also determine if a parking space is available or occupied. Thus, parking guidance application 170 may determine which parking spaces are available in parking structure 140 and guide user 102 to an available parking space. User 102 may be guided to a closest parking space, a parking space closest to a merchant (e.g., the merchant corresponding to merchant device 150), an entrance/exit to parking structure 140, a parking space having the least of fastest traffic to travel to the parking space, or other available parking space. Additionally, based off of information about user 102 (e.g., an identifier, check-in information, and/or information submitted using parking application 120); user 102 may be guided to other parking spaces. For example, expectant mothers, elderly, and/or physically impaired may be guided to closer parking spaces than other users. Vehicles having electric motors may be guided to closer spaces or spaces having electric charges as well.

Parking guidance application 170 may also take into account parking space size so that small and large vehicles may more easily fit in parking spaces that parking guidance application 170 directs their respective users. Thus, parking guidance application 170 may capture information from cameras and sensors 146 for use in determining a size of an available and/or occupied parking space. For example, a camera (e.g., video, infrared, still image, etc.), camera may be utilized to detect a size of a vehicle in or arriving at a parking space and compare the size of the vehicle with a known size of a parking space to determine how much room/area within the parking space the vehicle is occupying. If the vehicle is occupying a small or normal sized amount, parking spaces adjacent to the occupied parking space may be determined to have sufficient or normal available area such that user 102 may easily park their vehicle in the adjacent available parking spaces and exit their vehicle. However, if the vehicle in the occupied parking space is large and occupying up to the borders of the parking space, user 102 may be guided to another parking space that may have more adjacent room. Additionally, a size for user 102's vehicles may affect the determination, such that large vehicles are not placed next to each other. Thus, if user 102's vehicle is comparatively small next to the large vehicle in the occupied space, it may be determined that user 102 may still comfortably exit their vehicle. Moreover, if the vehicle is over the size of the space, a parking enforcement officer for parking structure 140 may be notified so they may take appropriate action.

Once available spaces and information about parking space size, location, and accessibility are determined by parking guidance application 170, parking guidance application 170 may transmit the information with a map or designated on a previously received map to device 110 for viewing by user 102. Additionally, parking guidance application 170 may inform user 102 of fees, validation services, time limits, and or meter services. As previously discussed, a merchant for merchant device 150 may provide partial or complete payment for any cost to use a parking space and/or parking structure 140 by user 102. Additionally, parking guidance application 170 may assist user 102 in utilizing curbside delivery and/or automated lockers 144 by informing user 102 and/or the merchant for merchant device 150 of the parking space occupied by the vehicle for user 102. The information for the occupied parking space by user 102's vehicle may also be used to provide payment for fees and/or meters, upgrade parking services (e.g., to a preferred and/or valet parking), and/or assist user 102 when returning to their vehicle by the merchant and/or a parking attendant for parking structure 140, as previously discussed.

Check-in application 162 may correspond to processes to complete check-in with device 110 for a location corresponding to parking structure 140 (e.g., with one or more of wireless beacons 142 established at parking structure 140, such as in parking spaces and/or at entrances/exits). Thus, check-in application 162 may correspond to the server side application configured to receive check-in information from device 110 and complete the check-in. The check-in request may include log in information for a user account with parking provider server 160 and thus complete the check-in with user 102 by verifying the account information. For example, the check-in information may include an identifier or other account information for an account of user 102 used to pay for parking at parking structure 140. However, in embodiments where a user account has not been previously established by user 102, check-in application 162 may receive other information identifying user 102, including a user name/identifier, user device identifier, an identifier for an account with another server, or other information. Such information may also be used to associate user 102 with one of wireless beacons 142 receiving the information, thereby associating user 102 and their vehicle with a location in parking structure 140. Thus, check-in application 162 may be utilized to determine where user 102 has parked a vehicle in parking structure 140, if user 102 is requesting parking guidance or parking services at parking structure 140, and/or if user 102 is exiting a parking space and/or parking structure 140.

In various embodiments, parking provider server 160 includes other applications 164 as may be desired in particular embodiments to provide features to parking provider server 160. For example, other applications 164 may include security applications for implementing server-side security features, programmatic server applications for interfacing with appropriate application programming interfaces (APIs) over network 180, or other types of applications. Other applications 164 may contain software programs, executable by a processor, including a graphical user interface (GUI), configured to provide an interface to a user.

Parking provider server 160 further includes a database 166 including information used to determine parking guidance and provide parking services to user 102. When an identifier for user 102 is transmitted to parking provider server 160, e.g. from wireless beacons 142 and/or check-in information, parking provider server 160 may store the identifier to database 166 for later use in associating a parking space with the identifier. Thus, information for a parking space may also later be stored with the identifier. Database 166 may include payment information and/or payment receipts for parking fees paid by user 102. Information from merchant device 150 may also be stored to database 166, such as parking fee payments and receipts for payment of user 102's parking fees and/or information about use of curbside delivery, valet services, and/or automated lockers 144. Database 166 may further include additional information received from parking structure 140, such as space available and parking space available area. Such data may be received from one or more of wireless beacons 142 and/or cameras and sensors 146.

In various embodiments, parking provider server 160 includes at least one network interface component 168 adapted to communicate device 110, wireless beacons 142, and/or merchant device 150 over network 180. In various embodiments, network interface component 168 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 180 may be implemented as a single network or a combination of multiple networks. For example, in various embodiments, network 180 may include the Internet or one or more intranets, landline networks, wireless networks, and/or other appropriate types of networks. Thus, network 180 may correspond to small scale communication networks, such as a private or local area network, or a larger scale network, such as a wide area network or the Internet, accessible by the various components of system 100.

Figure 2A:
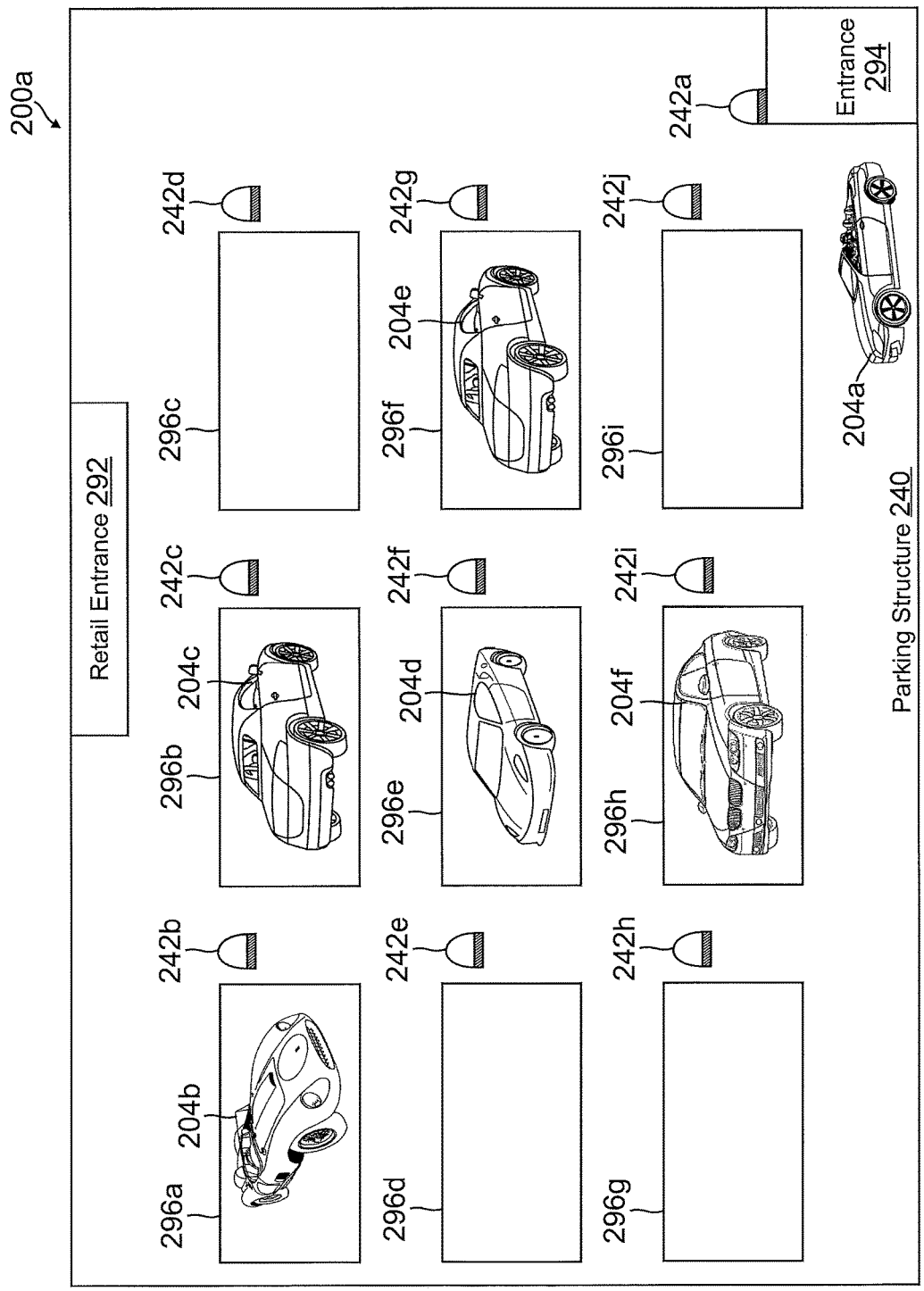
FIG. 2A is an exemplary parking structure environment displaying parking guidance to available parking spaces using wireless beacons, according to an embodiment.

FIG. 2A is an exemplary parking structure environment displaying parking guidance to available parking spaces using wireless beacons, according to an embodiment. Environment 200a of FIG. 2a includes a wireless beacon 242a, a wireless beacon 242b, a wireless beacon 242c, a wireless beacon 242d, a wireless beacon 242e, a wireless beacon 242f, a wireless beacon 242g, a wireless beacon 242h, a wireless beacon 242i, and a wireless beacon 242j, all corresponding to wireless beacons 142 of FIG. 1. Additionally, environment 200a includes a parking structure 240 corresponding to parking structure 140 of FIG. 1.

Parking structure 240 is shown with a plurality of parking spaces, shown as a parking space 296a, a parking space 296b, a parking space 296c, a parking space 296d, a parking space 296e, a parking space 296f, a parking space 296g, a parking space 296h, and a parking space 296i. Parking spaces 296a-i all correspond to parking spaces that a user may utilize to park a vehicle. Moreover, a plurality of vehicles are at or parking within parking structure 240, shown as a vehicle 204a, a vehicle 204b, a vehicle 204c, a vehicle 204d, a vehicle 204e, and a vehicle 204f. Vehicle 204a is shown arriving at parking structure 240 through an entrance 294. Wireless beacons 242a is located at entrance 294 in order to connect with a device within vehicle 204a. Thus, once vehicle 204a arrives at parking structure 240, the user within vehicle 204a may receive parking instructions and guidance based on a connection between a device for vehicle 204a and wireless beacons 242a.

A device or server for parking structure 240 may determine available parking spaces for vehicles within parking structure 240 and communicate the information for available parking spaces to a device for vehicle 204a so that a user of vehicle 204a may more easily find a parking space. Thus, using one or more for wireless beacons 242b-j and/or cameras and sensors located throughout parking structure 240 (e.g., at or nearby parking spaces 296a-i), the device/server for parking structure 240 may determine which parking spaces of parking spaces 296a-i are occupied. For example, wireless beacons 242b may detect vehicle 204b is located in parking space 296a based on a connection between a device for vehicle 204b connecting to wireless beacons 242b when vehicle 204b pulls into parking space 296a. In another embodiment, a device may not connect to a wireless beacon when a parking space is occupied, thus cameras and sensors may be utilized to determine if the parking space is occupied. For example, a weight sensor may determine that vehicle 204c is occupying parking space 296b.

Thus, parking spaces 296c, 295d, 296g, and 296i are shown as available parking spaces and may be determined to be available by the device/server for parking structure 240. A device within vehicle 204a may display that parking spaces 296c, 295d, 296g, and 296i are available, such as on a map or with directions to one or more of the parking spaces. In one example, vehicle 204a may be guided to a closest parking space, such as parking space 296i where vehicle 204a may immediately park. Parking space 296i may be optimized in situations where there is poor traffic flow through parking structure 240. However, other times vehicle 204a may be guided to parking space 296c, which is closest to a retail entrance 292.

The device/server may also determine an optimized space for vehicle 204a based on an available area within parking spaces 296c, 295d, 296g, and 296i and/or a size for vehicle 204a. Thus, if vehicle 204a and 204e in parking space 296e are large vehicles, the device/server for parking structure 240 may refrain from guiding vehicle 204a to parking space 296d and instead guide vehicle 204a to the farther parking space 296g, which may be situated next to a smaller vehicle 204f in parking space 296h.

Additional parameters about vehicle 204a and/or the occupants within vehicle 204a may further affect which of parking spaces 296c, 295d, 296g, and 296i is optimized for vehicle 204a. For example, health concerns, vehicle needs or features, and/or loyalty customer information may all affect which of parking spaces 296c, 295d, 296g, and 296i are either offered or optimized for vehicle 204a. Thus, parking space 296c may be reserved for expectant mothers, electric vehicles, or preferred customers as parking space 286c is located closest to retail entrance 292.

Figure 2B:
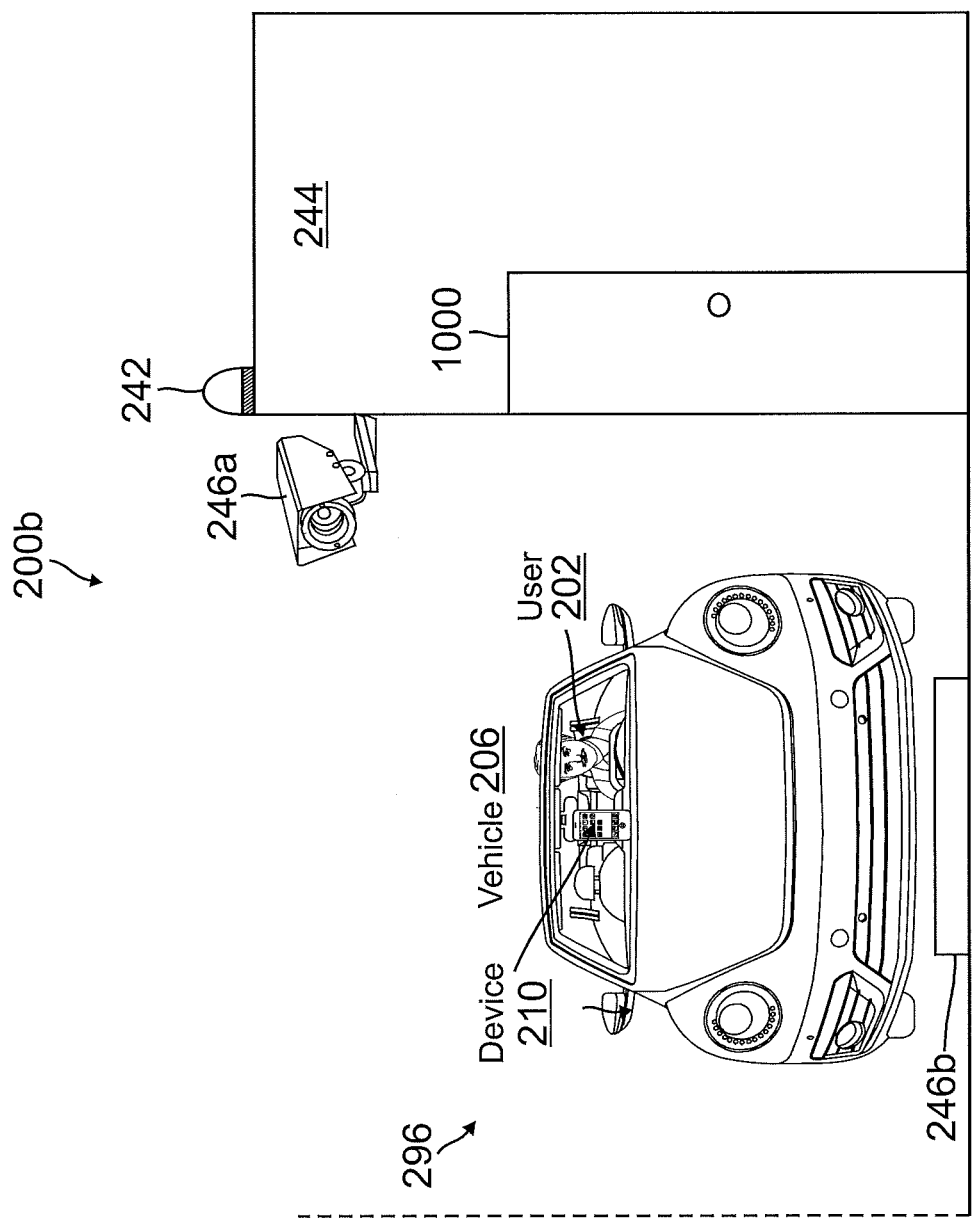
FIG. 2B is an exemplary parking space location offering parking services using wireless beacons, according to an embodiment.

FIG. 2B is an exemplary parking space location offering parking services using wireless beacons, according to an embodiment. Environment 200b includes a user 202 having a device 210 corresponding generally to user 102 and device 110, respectively, of FIG. 1. Additionally, environment 200b includes a wireless beacon 242 and an automated locker 244 corresponding generally to wireless beacons 142 and automated locker 144, respectively, of FIG. 1. Moreover, environment 200b includes a camera 246a and a sensor 246b corresponding generally to cameras and sensors 146 of FIG. 1.

A parking space 296 is shown in FIG. 2B occupied by a vehicle 206 that user 202 has parked in parking space 296. User 202 further has device 210, which may connect with wireless beacon 242 to provide parking guidance and parking services to user 202 and other users. User 202 may be initially guided to parking space 296 using a list of available parking spaces and/or a map of available parking spaces viewable on device 210. Once user 202 occupies parking space 296 with vehicle 206, at least one of wireless beacon 242, cameras 246a, and sensors 246b may determine that parking space 296 is occupied and remove parking space 296 from a list of available parking spaces. Moreover, a size of vehicle 206 and/or an amount of area within parking space 296 that is occupied by vehicle 206 may be determined using camera 246a and/or sensor 246b. Such information may be useful in guiding other users to adjacent parking spaces, as previously discussed.

In various embodiments, once user 202 has parked in parking space 296, user 202 and vehicle 206 may be associated with parking space 296. Thus, a merchant may know where vehicle 206 is within a parking location and bring items user 202 has purchased or provide services to user 202 while user 202 is shopping with the merchant or after the user has finished shopping with the merchant. Parking space 296 further include automated locker 244 nearby, which may assist a merchant in providing curbside pickup to user 202. Thus, if user 202 wishes to continue shopping with the merchant or other merchants after purchasing an item, the item may be stored in automated locker 244 for later pickup by user 202. Automated locker 244 includes a security entrance 1000, which may only allow access to the merchant and user 202. Security entrance 1000 may unlock when device 210 again pairs/connects with wireless beacon 242, or may include identification verification, a security lock requiring a passcode, or other security measure.

Figure 3:
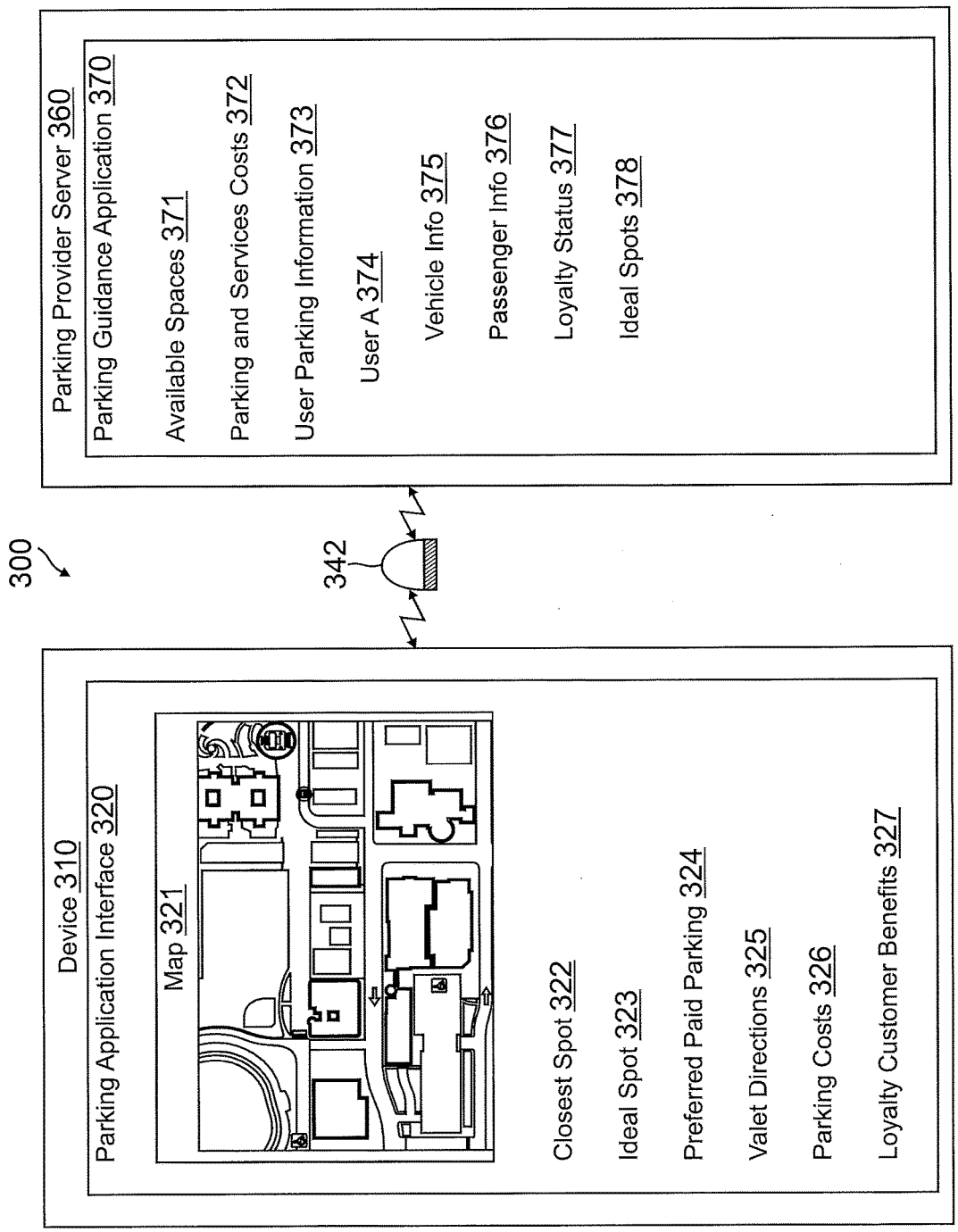
FIG. 3 is an exemplary system environment having a user device receiving parking guidance from a parking provider server, according to an embodiment.

FIG. 3 is an exemplary system environment having a user device receiving parking guidance from a parking provider server, according to an embodiment. Environment 300 of FIG. 3 includes a device 310, and a parking provider server 360 in communication using a wireless beacon 342 corresponding generally to device 110, parking provider server 160, and wireless beacons 142, respectively, of FIG. 1.

Device 310 displays a parking application interface 320 corresponding generally to the processes and features described in reference to parking application 120 of FIG. 1. Parking application interface 320 displays information to a user for use in parking guidance to available parking spaces. Information for parking guidance may be received from parking provider server either over a network connection or through wireless beacon 342 when device 310 pairs to wireless beacons 342 within a parking location. Thus, parking provider server 360 executes a parking guidance application 370 configured to provide parking guidance to the user of device 310.

Parking guidance application 370 collects information from wireless beacons at a parking location, cameras and/or sensors at the parking location, and merchants associated with the parking location. Using the data received about the parking location, parking guidance application 370 is able to determine available spaces 371, having parking spaces within the parking location that are available for the user of device 310 to park a vehicle. Parking guidance application 370 may also include general information about use of the parking location and the specific parking spaces, such as parking and services costs 372. Parking and services costs 372 may include parking admission fees, time limits and costs per amount of time, valet/preferred parking fees, and services and costs associated with the parking location (e.g., curbside delivery, use of automated lockers, carwash and/or maintenance services available at the parking location, etc.). One device 310 pairs to wireless beacon 342 and is requesting parking guidance for the user of device 310, parking guidance application 370 may determine parking guidance specifically for the user of device 310, e.g., user A. Thus, under user parking information 373, parking guidance application 370 includes a user A 374, having an identifier or other identification information for user A (e.g., check-in information), which may later be used to identify user A and associate user A with a parking space.

Further under user A 374, parking guidance application 370 includes vehicle information 375, passenger information 376, loyalty status 377, and ideal spots 378. Vehicle information 375 may be utilized to determine if a parking space is optimized for a vehicle, such as if the parking space is large enough, if the vehicle may park in a compact parking space, if the vehicle may utilize an electric parking space and/or charger, etc. Similarly, passenger information 376 may also be used to determine an ideal or optimized space for user A, such as if a closer space is needed for medical issues, if a large family is in a vehicle and may need a specific parking space, etc. Loyalty status 377 may correspond to information received about user A's past transactions and/or loyalty customer status with a merchant. Loyalty status 377 may be utilized to offer user A with incentives and/or upgraded parking services based on loyalty status 377. Using the aforementioned information, parking guidance application 370 may determine ideal spots 378.

Parking guidance application 370 may send part or all of the parking information for a parking location to device 310 for display to user A. In parking application interface 320, user A may view a map 321 and available parking spaces highlighted in map 321. User A may also filter available parking spaces displayed in map 321 according to the filters below map 321. Thus, user A may view a closest spot 322 highlight a closest available parking space to where user A is currently located. User A may also view information of ideal spots determined under ideal spots 378 by selecting the filter for ideal spot 323. If the parking location offers preferred paid parking and/or valet services, user A may choose to view preferred paid parking 324 or receive valet directions 325. Moreover, user A may view lists of parking costs 326 and loyalty customer benefits 327. User A may choose to pay for parking fees, meters, and costs under parking costs 326 or redeem a loyal customer benefit under loyalty customer benefits 327.

Figure 4:
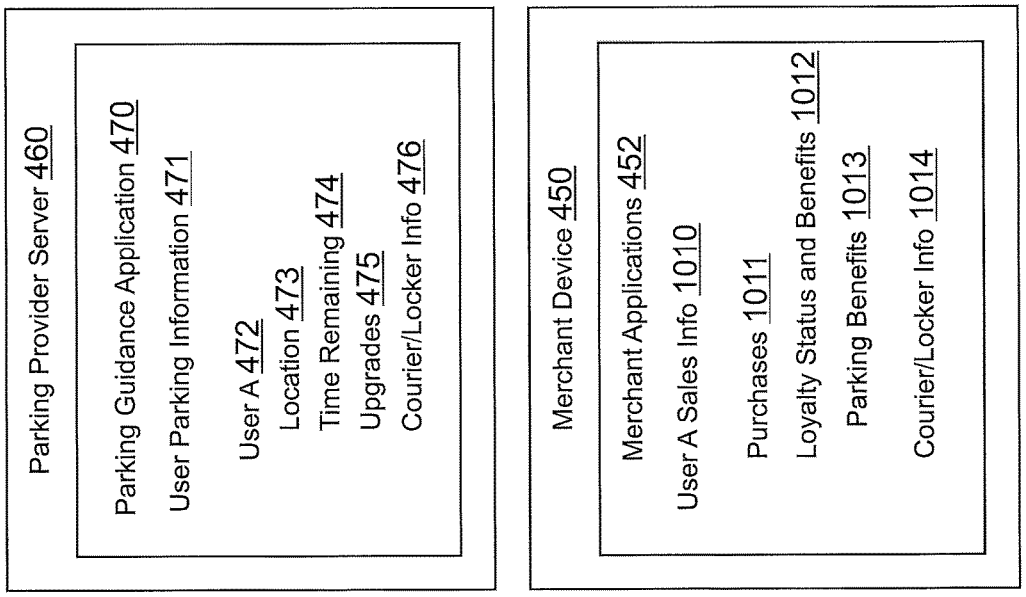
FIG. 4 is an exemplary system environment having a user device interacting with a merchant device and parking provider server to provide parking services, according to an embodiment.
Figure 4:
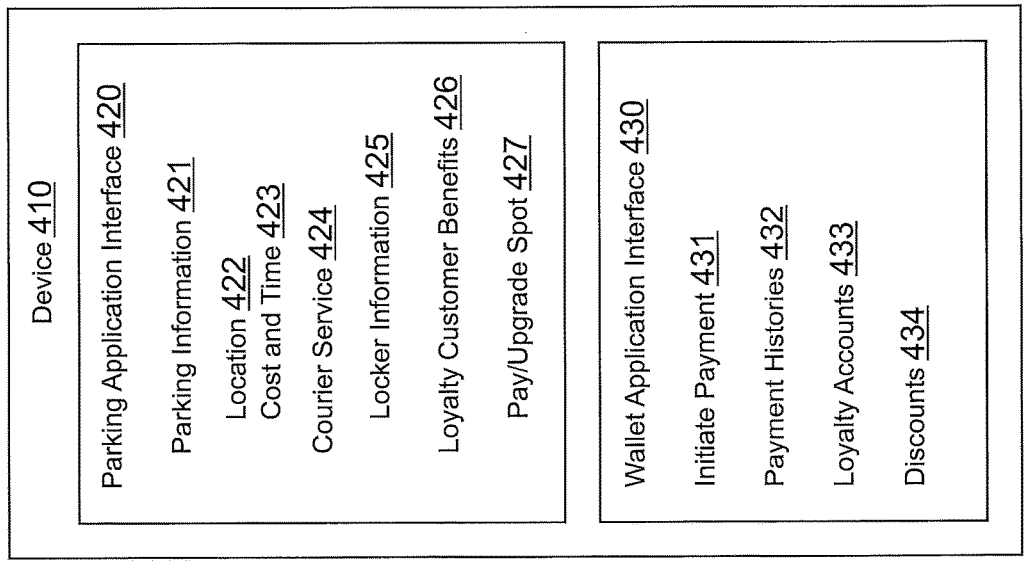

FIG. 4 is an exemplary system environment having a user device interacting with a merchant device and parking provider server to provide parking services, according to an embodiment. Environment 400 of FIG. 4 includes a device 410, a merchant device 450, and a parking provider server 460 corresponding generally to device 110, merchant device 150, and parking provider server 160, respectively, of FIG. 1.

Environment 400 displays a user of device 410 receiving parking services using one or more of merchant device 450 and/or parking provider server 460. Thus, after parking in a parking space in a parking location, parking provider server 460 may determine which parking space is occupied by the user of device 410's vehicle (e.g., through a wireless beacon for the parking space and/or cameras/sensors). Parking provider server 460 may execute a parking guidance application 470 that includes user parking information 471 having information about the user for device 410, user A. Thus, user A 472 includes identification information for user A, and is associated parking information for user A, shown as a location 473, time remaining 474, upgrades 475, and courier/locker information 476. Location 473 may correspond to a location of the occupied parking space by the vehicle for user A, such as a floor and area number/letter, a parking space number, GPS or map coordinate, etc. Time remaining 474 may include information about purchased parking time by user A. In other embodiments, time remaining 474 may correspond to parking fees and/or costs for user A. Further, upgrades 475 may include upgrades or services offered by a merchant for merchant device 450, while courier/locker information 476 may include information for a nearby automated locker and courier service for curbside delivery.

Information for user A may be transmitted by parking provider server 460 to device 310 and/or merchant device 450. Device 410 displays a parking application interface 420 corresponding generally to the processes and features described in reference to parking application 120 of FIG. 1. Thus, as shown in a parking application interface 420, user A is shown parking information 421 having location 422 enabling user A to identify where the parking space for user A's vehicle is located, and a cost and time 423 that may include parking fees paid for and/or required by user A for utilizing the parking space.

Merchant device 450 may choose to extend customer benefits to user A. Thus, merchant device 450 includes merchant application 452 having user A sales information 1010. User A sales information 1010 may be utilized to determine what benefits to extend to user A, such as parking upgrades, payments, validations, courier services, curbside pickup/delivery, use automated lockers, etc. Thus, user A sales information 1010 includes purchases 1011 having items/services user A has selected to purchase, loyalty status and benefits 1012 having benefits associated with a loyalty account of user A, and courier/locker information 1014. Purchases 1011 may be used to determine if user A qualifies for parking upgrades and/or payments, as well as used to assist user A in curbside delivery and use of automated lockers. Loyalty status and benefits 1012 further includes parking benefits 1013 determined by merchant device 450 and available to user A. Further courier/locker information 1014 may be utilized to further assist user A in curbside delivery and user of an automated locker.

User A is shown parking services available for the parking space, such as courier service 424 and loyalty customer benefits 426. These parking services may be extended to user A based on information from merchant applications 452 and parking guidance application 470. Courier service 424 may correspond to a curbside delivery and/or use of an automated locker for items purchased by user A. Selection of courier server 424 may request curbside deliver and/or the use of the automated locker. Moreover, user A may view information about an automated locker shown under locker information 425. Locker information 425 may include a location and access information for the automated locker. User A may select to upgrade and/or pay for their parking space utilizing loyalty customer benefits 426. Thus, user A may select pay/upgrade spot 427 to view what benefits user A has accrued and apply those benefits to the parking space.

User A may also interact with a wallet application interface 430 to pay for parking and pull up stored loyalty benefits and discounts that may be applied to parking. Thus, wallet application interface 430 includes an initiate payment 431 process that may enable user A to initiate a payment to merchant device 450 and/or parking provider server 460. Wallet application interface 430 includes payment histories 432 having past payments to merchant device 450 and/or parking provider server 460 to provide proof of payment for parking or items picked up during curbside deliver. Further, user A may view loyalty accounts 433 and discounts 434 that allow user A to view and apply accrued benefits to parking.

Figure 5:
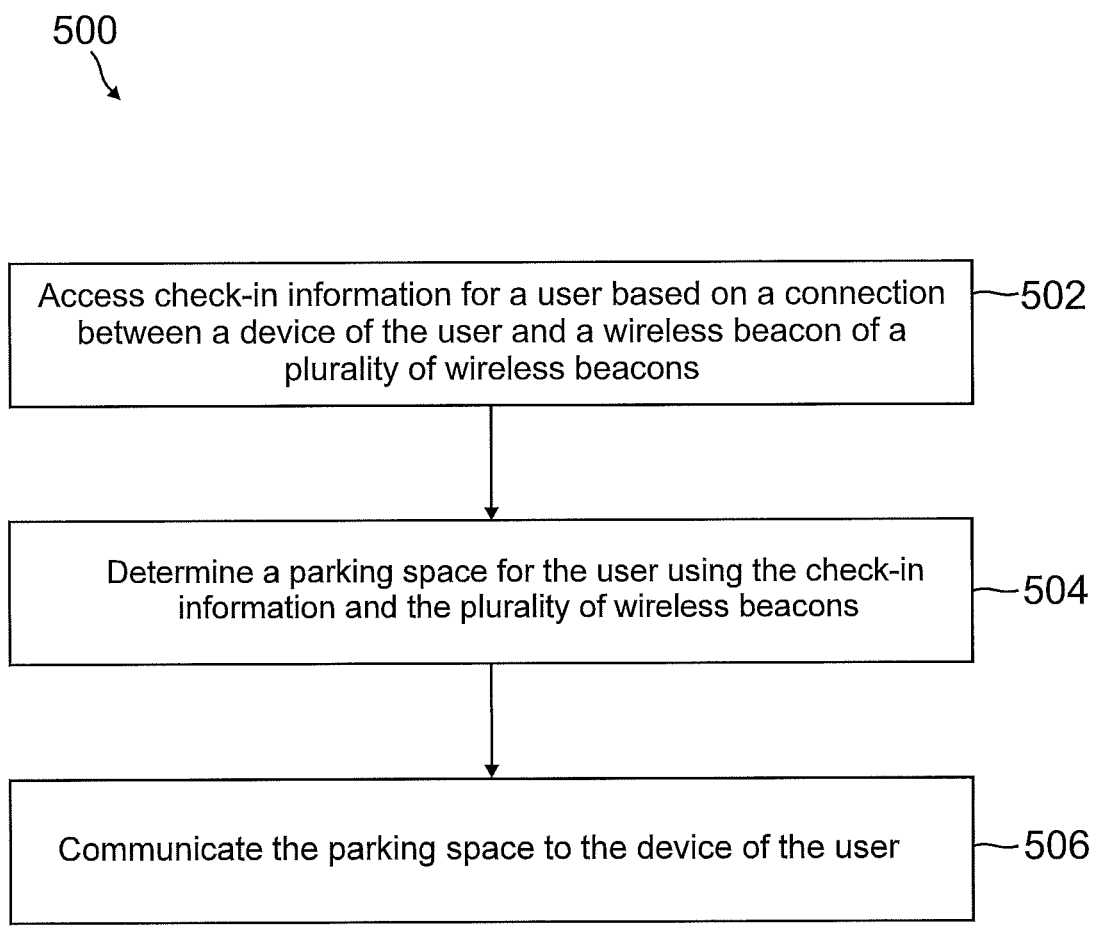
FIG. 5 is a flowchart of an exemplary process for parking guidance and parking services provided through wireless beacons, according to an embodiment.

FIG. 5 is a flowchart of an exemplary process for parking guidance and parking services provided through wireless beacons, according to an embodiment. Note that one or more steps, processes, and methods described herein may be omitted, performed in a different sequence, or combined as desired or appropriate.

At step 502, check-in information for a user is accessed based on a connection between a device of the user and a wireless beacon of a plurality of wireless beacons. The plurality of wireless beacons may be established throughout a parking location, such as at entrances, exits, and parking spaces. The connection may use one of near field communication, radio communication, infrared communication, Bluetooth communication, Bluetooth Low Energy (BLE) communication, and LTE Direct communication. Additionally, it may be determined that the user is at a parking location having a plurality of parking spaces based on the connection. Thus, the user may be requesting parking in one of the plurality of parking spaces. The check-in information may further include information for a vehicle corresponding to the user, such as a vehicle size, number of passengers, and medical status of one or more passengers.

A parking space for the user is determined using the check-in information and the plurality of wireless beacons, at step 504. For example, the parking space may be determined using a size of each of the plurality of parking spaces comparative to the vehicle's size. The parking space may also be determined using a loyalty account with a merchant or a transaction history of past purchases with the merchant by the user. A list of available parking spaces may be accessed, where the parking space is determined using the list of available parking spaces. Additionally, the available parking spaces may be determined using connections with the plurality of wireless beacons.

At step 506, the parking space is communicated to the device of the user. The parking space may be displayed on a map of the parking location to the user. All of the available parking spaces may also be displayed on the map. Once the user pulls into the parking space, a second connection may be established with a wireless beacon in the parking space, such that second check-in information is generated and the parking space is associated with the user. The user may also be associated with a storage locker at the parking space, where information for the storage locker and/or parking space is transmitted to the user and/or a merchant. The merchant may use the storage locker, for example during curbside delivery, and update the user of the use of the storage locker. The parking space may require a fee for use, which may be paid by the user using the device, or by a merchant using a merchant device. The merchant may also provide payment for the parking space based on user shopping actions with the merchant. If another user parks in the parking space prior to the user, the other user may be associated with the parking space and the user may be updated that the parking space is unavailable.

Figure 6:
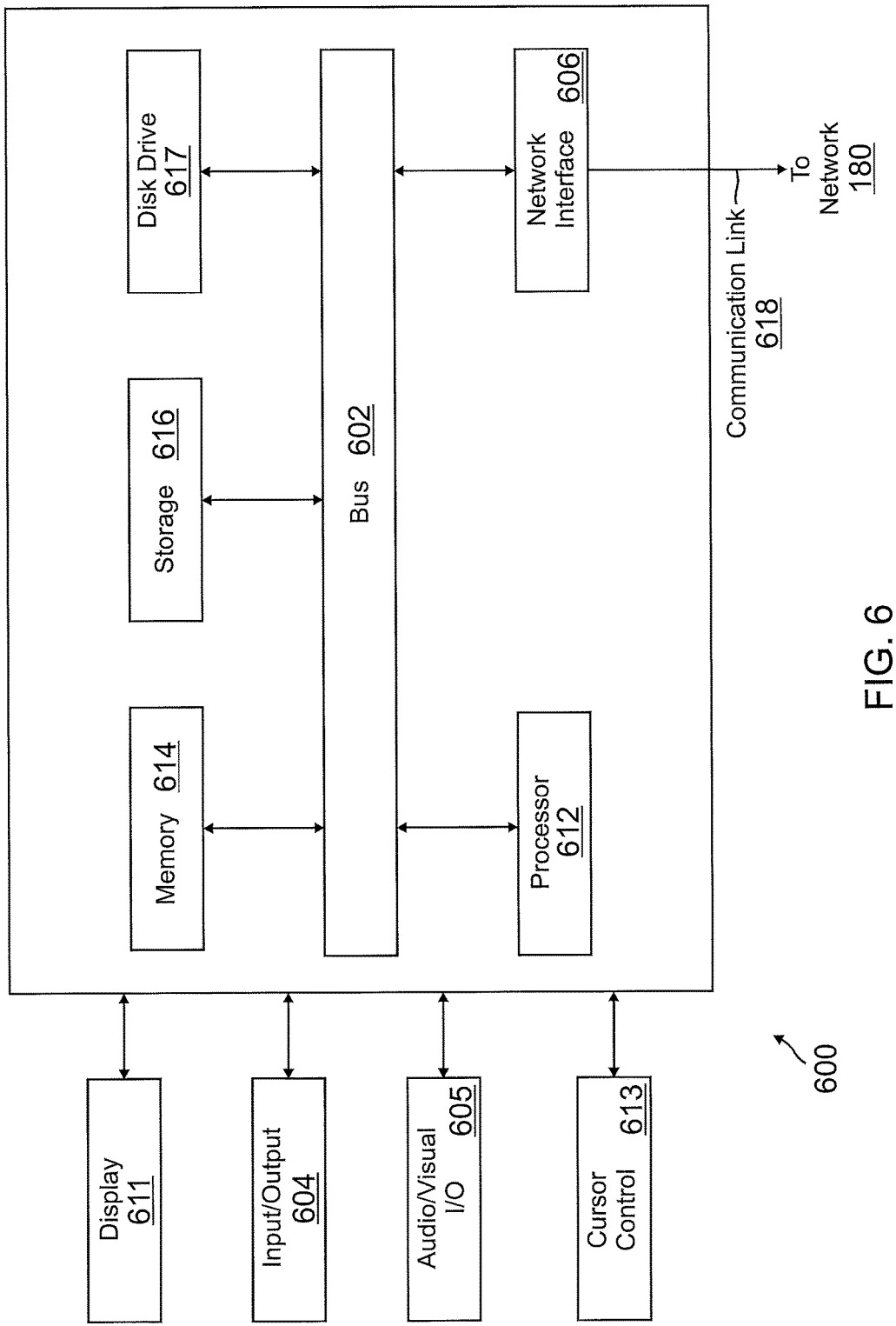
FIG. 6 is a block diagram of a computer system suitable for implementing one or more components in FIG. 1, according to an embodiment.

FIG. 6 is a block diagram of a computer system suitable for implementing one or more components in FIG. 1, according to an embodiment. In various embodiments, the user device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 600 in a manner as follows.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons, image, or links, and/or moving one or more images, etc., and sends a corresponding signal to bus 602. I/O component 604 may also include an output component, such as a display 611 and a cursor control 613 (such as a keyboard, keypad, mouse, etc.). An optional audio input/output component 605 may also be included to allow a user to use voice for inputting information by converting audio signals. Audio I/O component 605 may allow the user to hear audio. A transceiver or network interface 606 transmits and receives signals between computer system 600 and other devices, such as another user device, service device, or a service provider server via network 180. In one embodiment, the transmission is wireless, although other transmission mediums and methods may also be suitable. One or more processors 612, which can be a micro-controller, digital signal processor (DSP), or other processing component, processes these various signals, such as for display on computer system 600 or transmission to other devices via a communication link 618. Processor(s) 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor(s) 612 and other components by executing one or more sequences of instructions contained in system memory component 614. Logic may be encoded in a computer readable medium, which may refer to any medium that participates in providing instructions to processor(s) 612 for execution. Such a medium may take many forms, including but not limited to, non-volatile media, volatile media, and transmission media. In various embodiments, non-volatile media includes optical or magnetic disks, volatile media includes dynamic memory, such as system memory component 614, and transmission media includes coaxial cables, copper wire, and fiber optics, including wires that comprise bus 602. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
   a non-transitory memory; and
   one or more hardware processors coupled to the non-transitory memory and configured to read instructions from the non-transitory memory to cause the system to perform operations comprising:
      automatically detecting a first device for a first user at a parking location based on a first connection between the first device and a first wireless beacon of a plurality of wireless beacons within the parking location, wherein the first connection comprises a short range local wireless connection;
      retrieving, from the first device, first user data for the first user obtained through the first wireless beacon using the short range local wireless connection;
      in response to automatically detecting the first device, activating a camera device associated with the first wireless beacon, wherein the camera device monitors an area of the parking location associated with a proximity range for the first connection;
      receiving, from the camera device, image data for a first parking space and a second parking space adjacent to the first parking space within the area of the parking location;
      determining a vehicle size required by the first user and associated with the first user data;
      determining a parking space size restriction of the first parking space using the image data, wherein the parking space size restriction is determined based on whether the second parking space is occupied or a position of a vehicle occupying the second parking space;
      determining that the first parking space is suitable based on the parking space size restriction and the vehicle size; and
      communicating location data for the first parking space to the first device of the first user.

2. The system of claim 1, wherein the first connection between the first device and the first wireless beacon uses one of near field communication, radio communication, infrared communication, Bluetooth communication, Bluetooth Low Energy (BLE) communication, or LTE Direct communication.

3. The system of claim 1, wherein the operations further comprise:
   receiving the first user data for the first user from a second connection between the first device and a second wireless beacon of the plurality of wireless beacons, wherein the second wireless beacon is located at or nearby the first parking space; and
   associating the first user with the first parking space.

4. The system of claim 3, wherein the operations further comprise:
   associating the first user with a storage locker at the first parking space; and
   transmitting information for the storage locker to at least one of the first device for the first user or a second device for a merchant.

5. The system of claim 4, wherein the operations further comprise:
   receiving an update from the second device, wherein the update comprises a use of the storage locker by the merchant; and
   transmitting the update to the first device.

6. The system of claim 1, wherein the operations further comprise:
   receiving second user data for a second user from a second connection between a second device for the second user and a second wireless beacon of the plurality of wireless beacons, wherein the second wireless beacon is located at or within a first distance to the first parking space;
   associating the second user with the first parking space; and
   updating the first user that the first parking space is unavailable.

7. The system of claim 1, wherein the first parking space is further determined using at least one of a loyalty account with a merchant for the first user or a transaction history of past purchases with the merchant by the first user.

8. The system of claim 1, wherein the first parking space requires a fee for use of the first parking space, and wherein the first user issues a first payment for the fee using the first device.

9. The system of claim 8, wherein the fee is based on user shopping actions with a merchant and is merchant-provided.

10. A method comprising:
    automatically detecting a device for a user at a parking location based on a connection between the device and a first wireless beacon of a plurality of wireless beacons within the parking location, wherein the connection is established without user input to the device and comprises a short range local wireless connection, and wherein the parking location comprises a plurality of parking spaces;

retrieving, from the device, user data for the user obtained through the first wireless beacon using the short range local wireless connection;
in response to automatically detecting the device, activating a camera device associated with the first wireless beacon, wherein the camera device monitors an area of the parking location associated with a proximity range for the connection;
receiving, from the camera device associated with the first wireless beacon, image data for two adjacent parking spaces of the plurality of parking spaces within the area of the parking location;
determining a vehicle size required by the user at the parking location from the image data and the user data;
determining parking space size restrictions for the two adjacent parking spaces using the image data, wherein the parking space size restrictions are determined based on whether the one of the two adjacent parking spaces is occupied or a position of a vehicle occupying the one of the two adjacent parking spaces;
determining that a parking space of the two adjacent parking spaces is suitable based on the parking space size restrictions and the vehicle size; and
communicating location data for the parking space to the device of the user.

11. The method of claim 10, wherein prior to the determining that the parking space is suitable, the method further comprises:
receiving check-in information from the connection and input by the user using a check-in application of the device, wherein the check-in information comprises information for a vehicle corresponding to the user,
wherein the parking space is further determined to be suitable using the check-in information.

12. The method of claim 11, wherein the information for the vehicle comprises at least one of the vehicle size, a number of passengers in the vehicle, or a medical status of one or more passengers in the vehicle.

13. The method of claim 12, wherein the parking space is further determined to be suitable using at least one of a loyalty account for the user or a transaction history of past purchases with a merchant by the user.

14. The method of claim 10, wherein the device displays the parking space to the user on a map of the parking location.

15. The method of claim 10, wherein prior to the determining that the parking space is suitable, the method further comprising:
accessing a list of available parking spaces of the plurality of parking spaces,
wherein the parking space is further determined to be suitable using the list of available parking spaces.

16. The method of claim 15, wherein the list of available parking spaces is determined using at least one of connections between devices and the plurality of wireless beacons or vehicle sensors for the plurality of parking spaces.

17. A non-transitory machine-readable medium having stored thereon machine-readable instructions executable to cause a machine to perform operations comprising:
in response to automatically detecting a device for a user at a parking location based on a connection between the device and a wireless beacon of a plurality of wireless beacons within the parking location, determining the user requires a parking space in the parking location for a vehicle, wherein the connection comprises a short range local wireless connection;
retrieving, from the device, user data for the user obtained through the wireless beacon using the short range local wireless connection;
in response to automatically detecting the device, activating a camera device associated with the wireless beacon, wherein the camera device monitors an area of the parking location associated with a proximity range for the connection;
receiving, from the camera device associated with the wireless beacon, image data for a first parking space and a second parking space adjacent to the first parking space within the area of the parking location;
determining a vehicle size for a vehicle utilized by the user using the image data and the user data;
determining a parking space size restriction in the parking location of the first parking space using the image data, wherein the parking space size restriction is determined based on whether the second parking space is occupied or a position of a vehicle occupying the second parking space;
determining that the first parking space is suitable based on the parking space size restriction and the vehicle size; and
communicating location data for the first parking space to the device of the user.

18. The non-transitory machine-readable medium of claim 17, wherein the operations further comprise:
accessing a list of available parking spaces of a plurality of parking spaces in the parking location, wherein the list of available parking spaces is determined using at least one of connections between devices and the plurality of wireless beacons or vehicle sensors for the plurality of parking spaces, and wherein the first parking space is further determined using the list of available parking spaces.

19. The non-transitory machine-readable medium of claim 17, wherein the first parking space requires a fee for use of the first parking space, wherein the fee is partially user-provided and partially merchant-provided based on user shopping actions with a merchant.

20. The system of claim 1, wherein the operations further comprise:
determining a traffic flow data through the parking location using at least one of the image data or the plurality of wireless beacons,
wherein the first parking space is determined to be suitable based on the traffic flow data.

* * * * *

UNITED STATES PATENT AND TRADEMARK OFFICE
CERTIFICATE OF CORRECTION

PATENT NO. : 10,062,132 B2
APPLICATION NO. : 14/586868
DATED : August 28, 2018
INVENTOR(S) : David Edward Eramian et al.

It is certified that error appears in the above-identified patent and that said Letters Patent is hereby corrected as shown below:

In the Detailed Description:

In Column 20, Line 65, change "One device 310 pairs" to --Once device 310 pairs--.

Signed and Sealed this
Eleventh Day of December, 2018

Andrei Iancu
*Director of the United States Patent and Trademark Office*